UNITED STATES PATENT OFFICE.

JOHN V. WILSON AND CHARLES R. WORES, OF TUCSON, ARIZONA TERRITORY.

MEDICAL COMPOUND.

SPECIFICATION forming part of Letters Patent No. 515,455, dated February 27, 1894.

Application filed June 14, 1893. Serial No. 477,564. (No specimens.)

*To all whom it may concern:*

Be it known that we, JOHN V. WILSON and CHARLES R. WORES, citizens of the United States, residing at Tucson, Pima county, Territory of Arizona, have invented a new and useful Composition of Matter to be Used as a Salve; and we hereby declare the following to be a full, clear, and exact description of the same.

The essential ingredient and basis of our salve is derived from a plant or herb of the order *Helianthoideæ*, genus *Encelia*, and species *Farinosa*. This plant is common in the south-western portion of the United States, being found in abundance in the foothills and mountains of Arizona. It is known locally by the name of "Yerba-del-Bazo." We have discovered that preparations or products of this plant, whether in the form of the resinous or waxy extract which exudes from it when broken or wounded, or when boiled, or in the form of a liquid extract of the leaves and stems, or other extracts derived from it or from any portion of it, have peculiarly beneficial properties of a healing nature when incorporated in and forming an ingredient of a salve composition. The remaining ingredients may be of any suitable character, such, for example, as lard, beef-marrow, bees-wax, &c. We do not, however, confine ourselves to these particular accompanying ingredients, nor to their number, as others equally well known as equivalents may be used, nor to the proportions in which they are mixed, as the essential feature or ingredient of the salve is a preparation or product of the plant mentioned. In practice, however, we compound the salve as follows: a preparation or product of the plant *Encelia farinosa* one pound, lard one and one-half pounds, beef marrow one pound, beeswax, one-half pound. These are mixed together thoroughly.

The first ingredient, it is best to explain, may be any preparation of the stated plant. Such preparations may be of various kinds, unnecessary to describe in detail, as processes and products of this general nature are well known to manufacturing druggists and chemists. We may, however, for the sake of clearness and in order that others skilled in the art may be enabled to compound our salve from this specification, state that we have in actual practice used the following preparations: The plant being broken up fine is boiled. The resinous matter expelled by the heat rises to the surface in a waxy foam. This is skimmed off, and is mixed in with the other ingredients to form the salve. Also the leaves and stems of the plant, after being broken up are boiled in water. The resinous scum rising to the surface is removed, leaving the clear water. The boiling is continued for some time, say for two hours or more, or until the water becomes dark. Then the leaves and stems are removed and the dark colored liquid, being strained, is again boiled until it is reduced to an extract. This liquid extract or sirup is then mixed with the other ingredients to form the salve.

The salve is beneficial for all kinds of sores, pimples, boils and similar ailments, and may be used for all the purposes for which other salves are used.

Having thus described our invention, what we claim as new, and desire to secure by Letters Patent, is—

1. A composition of matter to be used as a salve consisting of an extract of resinous matter of the plant *Encelia farinosa* combined with a suitable vehicle such as are employed in the composition of salves.

2. A salve composed of the extract of resinous matter of the plant *Encelia farinosa*, lard, beef-marrow and bees-wax, substantially as herein described.

In witness whereof we have hereunto set our hands.

JOHN V. WILSON.
CHARLES R. WORES.

Witnesses:
ANDREW H. FLYNN,
WILLIAM J. OSBORN.